(12) United States Patent
Kent

(10) Patent No.: US 10,057,288 B2
(45) Date of Patent: Aug. 21, 2018

(54) SYNCHRONIZED ISSUANCE OF PUBLIC X.509 DIGITAL CERTIFICATES

(71) Applicant: CA, INC., New York, NY (US)

(72) Inventor: Joann Jayne Kent, Auburn, MA (US)

(73) Assignee: CA, Inc., New York, NY (US)

( * ) Notice: Subject to any disclaimer, the term of this patent is extended or adjusted under 35 U.S.C. 154(b) by 146 days.

(21) Appl. No.: 15/080,720

(22) Filed: Mar. 25, 2016

(65) Prior Publication Data
US 2017/0279784 A1 Sep. 28, 2017

(51) Int. Cl.
| H04L 29/06 | (2006.01) |
| H04L 9/00 | (2006.01) |
| H04L 9/30 | (2006.01) |
| H04L 9/32 | (2006.01) |
| H04L 9/08 | (2006.01) |

(52) U.S. Cl.
CPC ............ *H04L 63/166* (2013.01); *H04L 9/007* (2013.01); *H04L 9/0825* (2013.01); *H04L 9/0891* (2013.01); *H04L 9/30* (2013.01); *H04L 9/3247* (2013.01); *H04L 9/3265* (2013.01); *H04L 63/0823* (2013.01); *H04L 63/068* (2013.01)

(58) Field of Classification Search
CPC ............................. H04L 63/064; H04L 9/007
USPC ........................................................ 713/151
See application file for complete search history.

(56) References Cited

U.S. PATENT DOCUMENTS

| 6,763,459 | B1 | 7/2004 | Corella | |
| 2006/0098824 | A1 | 5/2006 | Mao | |
| 2011/0264911 | A1* | 10/2011 | Hayashi | H04L 9/12 713/158 |
| 2017/0230355 | A1* | 8/2017 | Su | H04L 63/0823 |

FOREIGN PATENT DOCUMENTS

CA            2573101 A1    1/2006

\* cited by examiner

*Primary Examiner* — Anthony Brown
(74) *Attorney, Agent, or Firm* — Baker Botts L.L.P.

(57) ABSTRACT

A method includes receiving, from a certificate requestor: a request for a public key certificate and a list of a plurality of distribution addresses. The request may include a public key for the certificate requestor. The plurality of distribution addresses may belong to a plurality of third parties. The method further includes verifying an identity of the certificate requestor, and, in response to verifying the identity of the certificate requestor, retrieving a public key from the request for the public key certificate. The method may also include, in response to verifying the identity of the certificate requestor, generating the public key certificate and signing the public key certificate. The public key certificate may include the public key. The method may also include transmitting the signed public key certificate to the certificate requestor and the plurality of distribution addresses.

19 Claims, 13 Drawing Sheets

SYNCHRONIZED ISSUANCE OF PUBLIC X.509 DIGITAL CERTIFICATES

BACKGROUND

The disclosure relates generally to X.509 digital certificates, and more specifically to synchronized issuance of public X.509 digital certificates.

SUMMARY

According to one embodiment of the disclosure, a method includes receiving a request from a certificate user to utilize a short-term private key-public key pair. The short-term private key-public key pair includes a short-term private key and a public key. The short-term private key may expire after a period less than a year in length. The method further includes generating, using a processor, the short-term private key and generating, using the processor, the public key. The public key may correspond to the short-term private key. The method further includes requesting a public key certificate from a Certificate Authority (CA). The request for the public key certificate may include the public key. The method also includes receiving the public key certificate from the CA and pairing the short-term private key with the public key certificate. The public key certificate may include the public key that corresponds to the short-term private key. The method further includes storing the short-term private key-public key pair to a storage.

According to another embodiment of the disclosure, a method includes receiving, from a certificate requestor: a request for a public key certificate and a list of a plurality of distribution addresses. The request may include a public key for the certificate requestor. The plurality of distribution addresses may belong to a plurality of third parties. The method further includes verifying an identity of the certificate requestor, and, in response to verifying the identity of the certificate requestor, retrieving a public key from the request for the public key certificate. The method may also include, in response to verifying the identity of the certificate requestor, generating the public key certificate and signing the public key certificate. The public key certificate may include the public key. The method may also include transmitting the signed public key certificate to the certificate requestor and the plurality of distribution addresses.

According to another embodiment of the disclosure, a method includes generating, using a processor, a private key-public key pair. The private key-public key pair may include a private key and a public key. The method also includes generating a request for a public key certificate. The request may include the public key. The method further includes sending the request for the public key certificate to a Certificate Authority (CA) and receiving the public key certificate from the CA. The public key certificate may be signed by the CA. The method also includes using the public key certificate received from the CA and transmitting the public key certificate received from the CA to a plurality of distribution addresses. The plurality of distribution addresses belong to a plurality of third parties.

According to another embodiment of the disclosure, a method includes, for respective queues of a plurality of queues stored in a storage: generating, using a processor, a private key-public key pair; and storing the private key-public key pair to a back of the queue. The private key-public key pair may include a private key and a public key. The method also includes receiving a request from a certificate user to utilize a private key-public key pair. The method further includes retrieving a first private key-public key pair from a front of a first queue of the plurality of queues. The method also includes using the first private key-public key pair and generating a new private key-public key pair to replace the first private key-public key pair. The method also includes storing the new private key-public key pair to a back of the first queue.

Other features and advantages of the present disclosure are apparent to persons of ordinary skill in the art in view of the following detailed description of the disclosure and the accompanying drawings.

BRIEF DESCRIPTION OF THE DRAWINGS

For a more complete understanding of the configurations of the present disclosure, needs satisfied thereby, and the features and advantages thereof, reference now is made to the following description taken in connection with the accompanying drawings.

DETAILED DESCRIPTION

Figure 1:
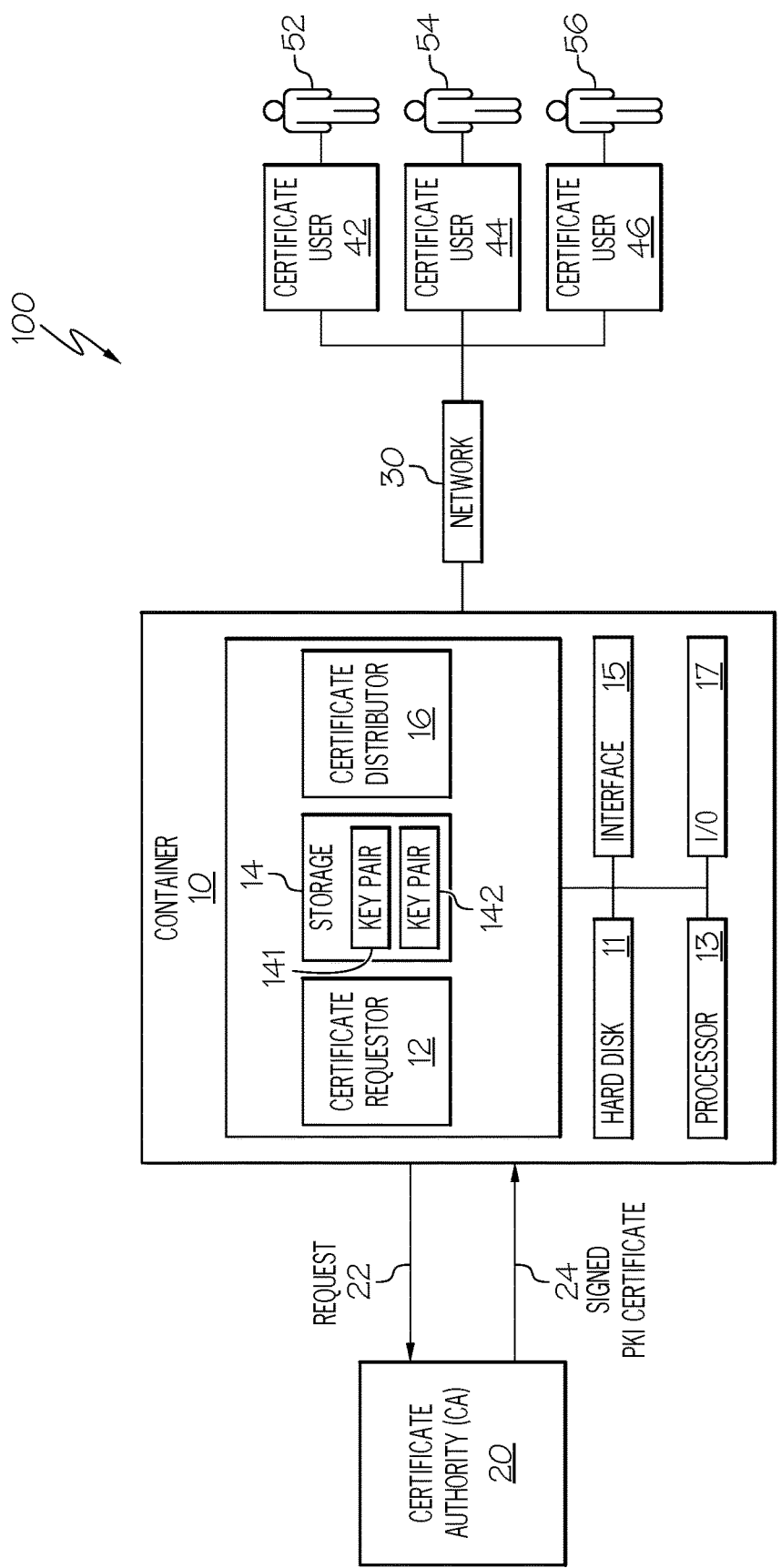
FIG. 1 illustrates a block diagram of a system for generating and storing short-term or one-time-use X.509 digital certificates in accordance with a non-limiting embodiment of the present disclosure.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely in hardware, entirely in software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language, such as JAVA®, SCALA®, SMALLTALK®, EIFFEL®, JADE®, EMERALD®, C++, C#, VB.NET, PYTHON® or the like, conventional procedural programming languages, such as the "C" programming language, VISUAL BASIC®, FORTRAN® 2003, Perl, COBOL 2002, PHP, ABAP®, dynamic programming languages such as PYTHON®, RUBY® and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to aspects of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

Public key cryptography enables users to securely communicate over insecure public networks. In the typical public key infrastructure (PKI) arrangement, a public key is sent to a trusted third party (TTP) known as a certificate authority (CA), who issues and signs an X.509 digital certificate. X.509 is a standard that specifies the format for public key certificates, among other aspects of a PKI system. The X.509 standard is described in RFC 2459, published in 1999, and the more current version is described in RFC 5280, published in 2008. A certificate user can use the X.509 digital certificate to verify the sender's identity, to encrypt data, to sign data, or other uses.

A standard X.509 certificate contains a public key that corresponds to the certificate user's private key. The certificate user uses her own private key to sign or encrypt data and distributes her public key to external users to use to decrypt or authenticate data sent by the certificate user. Private key-public key pairs traditionally last between one and five years before they expire. Because an outsider's access to a sender's private key would unravel the entire security benefit of PKI systems, these private keys must be highly guarded. But an inherent risk remains—even if the private key is highly guarded—that the private key will be stolen. Once a private key is stolen, another entity may pretend to be someone he is not. In a traditional system, once a private key is discovered missing or stolen, the private key owner must tell the CA, who can invalidate the private key-public key pair.

Certain embodiments of the present disclosure provide digital certificates that increase the security of the PKI system by reducing the likelihood that the private key will be stolen. Short-term or one-time-use private keys may be used that need not be stored for the extended period of time (e.g., 1 to 5 years) that a traditional certificate may be kept. Certain embodiments of the present disclosure also provide a PKI system that enables public key certificates corresponding to private keys to be easily and efficiently distributed to third parties, as well as a queueing storage solution that increases speed and efficiency of retrieving and distributing private key-public key pairs, especially if those key pairs need be distributed often.

With reference to FIG. 1, a system 100 for generating and storing short-term or one-time-use X.509 digital certificates is illustrated in accordance with a non-limiting embodiment of the present disclosure. System 100 includes a container 10, which may be for example a web server. System 100 also includes a hard disk 11, processor 13, storage 14, interface 15, and input/output (I/O) 17. Processor 13 loads instructions from hard disk 11 and executes them in storage 14. Storage 14 may include temporary or permanent storage or memory, for example random access memory (RAM), a hard disk drive (HDD), a solid state drive (SDD), network attached storage (NAS), a USB thumb drive or flash drive, an optical drive such as a compact disc (CD) or digital video disc (DVD), cloud storage, or any other type of storage. Storage 14 may hold one or more short-term private key-public key pairs, for example key pair 141 and key pair 142. System 100 may also comprise certificate requestor 12 (for example, a web browser), which requests 22 a certificate from Certificate Authority (CA) 20. CA 20 may return signed public key infrastructure (PKI) certificate 24, which may also be known as a public key certificate, to certificate requestor 12. System 100 may also include certificate distributor 16, which may distribute signed PKI certificates, for example signed PKI certificate 24, to a certificate user, for example certificate user 42. Certificate distributor 16 may distribute a second signed PKI certificate to certificate user 44, and a third signed PKI certificate to certificate user 46. A user, for example user 52, user 54, or user 56, may be for example a system administrator or a general member of the public attempting to gain access to a particular website. The user may access a system that needs to use a certificate, for example user 52 may access certificate user. The components of system 100, including certificate authority 20, server 10, and certificate users 42, 44, and 46 are all connected via network 30.

Figure 2:
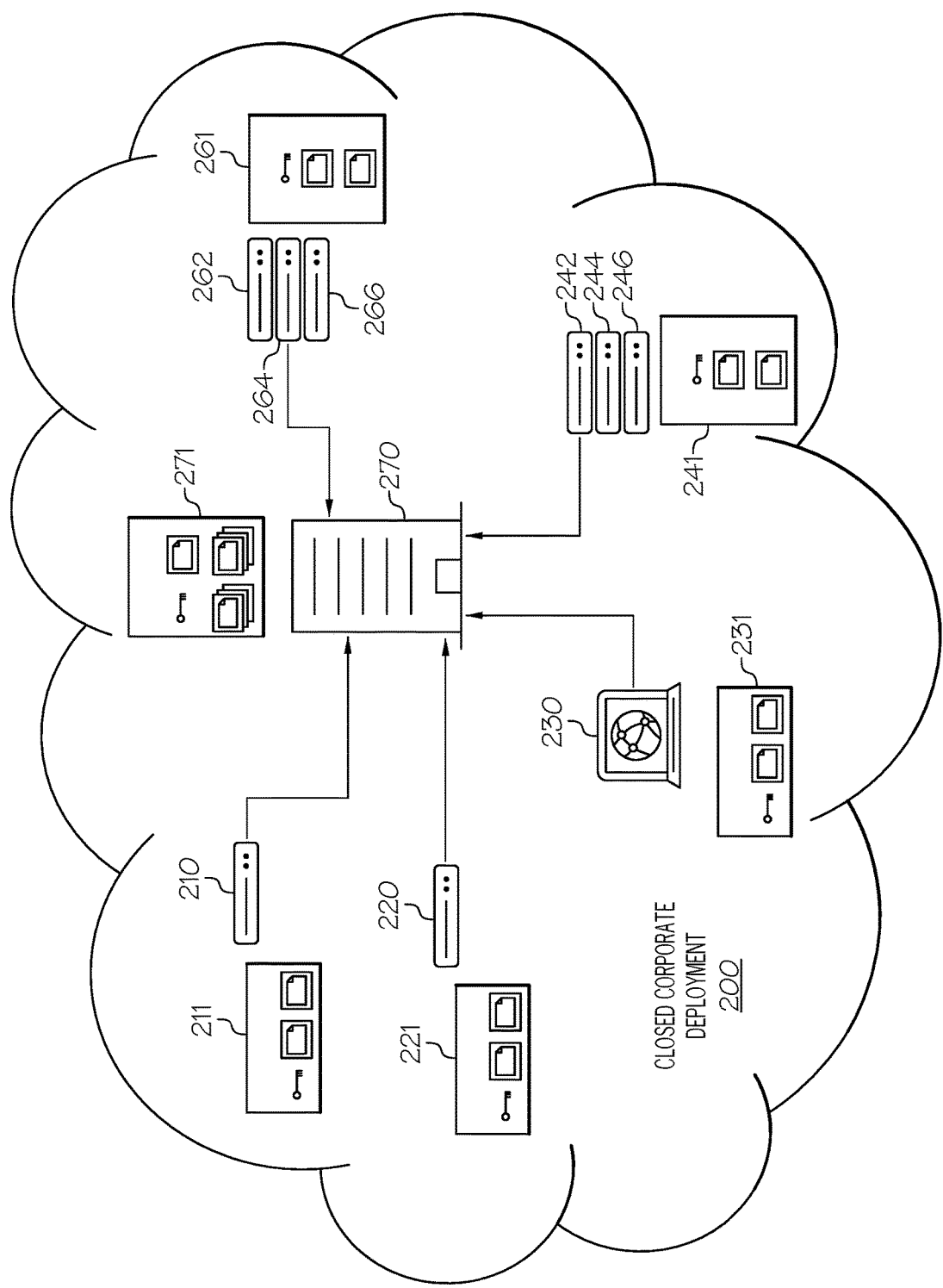
FIG. 2 illustrates a real-world implementation of a system for generating and storing short-term or one-time-use X.509 digital certificates in a closed corporate deployment environment in accordance with a non-limiting embodiment of the present disclosure.

With reference to FIG. 2, a real-world implementation of a system 200 for generating and storing short-term or one-time-use X.509 digital certificates in a closed corporate deployment environment is illustrated in accordance with a non-limiting embodiment of the present disclosure. System 200 may be a closed corporate deployment environment, which may have a closed network. System 200 may include a central server 270, which may have a certificate requestor that requests public key certificates 271 from the certificate authority and a certificate distributor that distributes public key certificates 271 to the certificate users. System 200 may have one or more certificate users, for example server 210, server 220, computer 230, multiple servers 262, 264, or 264, or multiple servers 242, 244, or 246. Computer 230 may be a laptop computer or a desktop computer. Server 270 may just distribute public key certificate 271 to a certificate user, or server 270 may use public key certificate 271 to encrypt data sent over the closed corporate network. Server 270 may distribute public key certificate 211 to certificate user server 210, public key certificate 221 to certificate user server 220, public key certificate 231 to certificate user computer 230, public key certificates 241 to certificate user servers 242, 244, and 246, public key certificate 261 to certificate user servers 262, 264, or 266.

Figure 3:
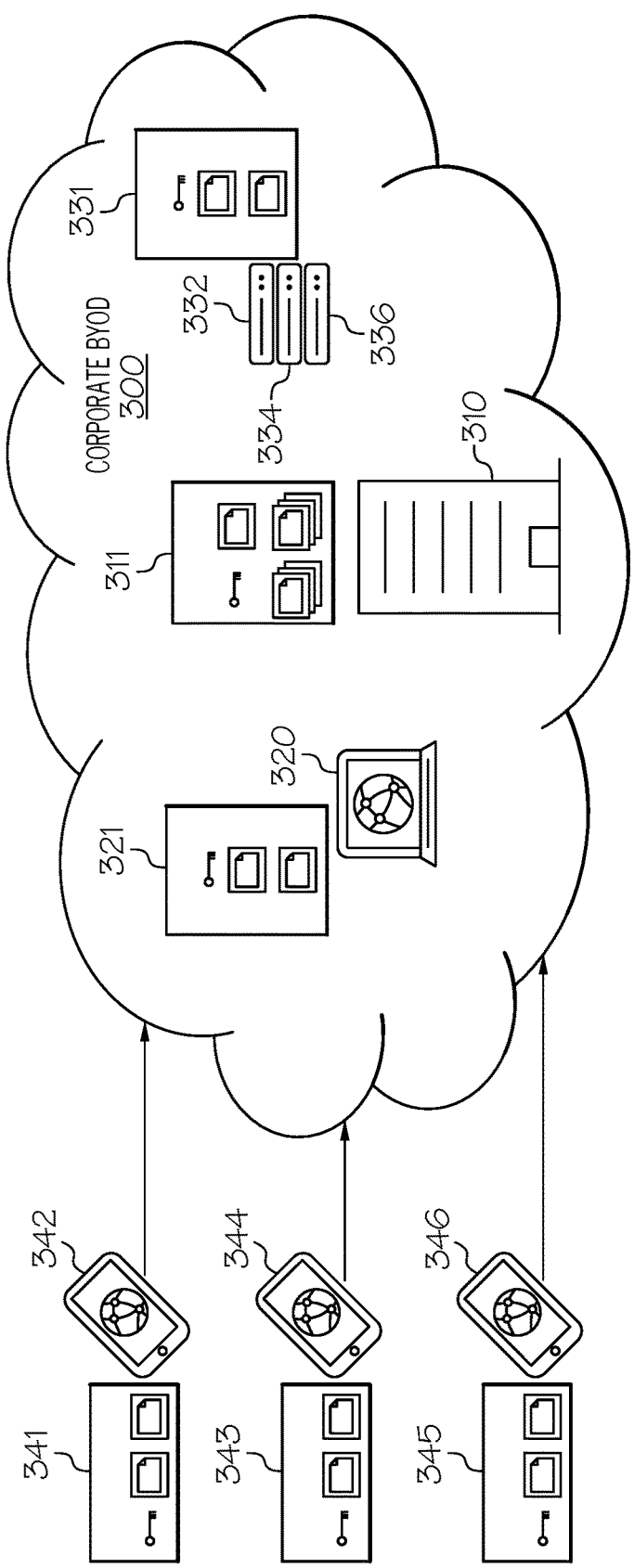
FIG. 3 illustrates a real-world implementation of a system for generating and storing short-term or one-time-use X.509 digital certificates in a corporate Bring-Your-Own-Device (BYOD) environment in accordance with a non-limiting embodiment of the present disclosure.

With reference to FIG. 3, a real-world implementation of a system 300 for generating and storing short-term or one-time-use X.509 digital certificates in a corporate Bring-Your-Own-Device (BYOD) environment is illustrated in accordance with a non-limiting embodiment of the present disclosure. A BYOD environment is one in which entities, usually employees, bring their own computing devices (e.g., smartphone, tablet, laptop) to the workplace. Security is a particular concern in BYOD environments due to the variety of devices an information technology (IT) group may have to support, and the inherent inconsistency associated with supporting that number of devices. System 300 may be a corporate BYOD environment with a central server 310 that sends and receives short-term or one-time-use digital certificates 311. System 300 may have other devices within the closed corporate network, including for example computer 320 that sends and receives short-term or one-time-use digital certificates 321, and/or a series of servers 332, 334, and 336 that send and receive short-term or one-time-use digital certificates 331. System 300 may then include the devices brought by employees to the BYOD network that also send and receive short-term or one-time-use digital certificates. For example, system 300 may include one or more devices (e.g., smartphones, tablets) 342, 344, and/or 346, each of which sends and receives short-term or one-time-use digital certificates 341, 343, and/or 345, respectively.

Figure 4:
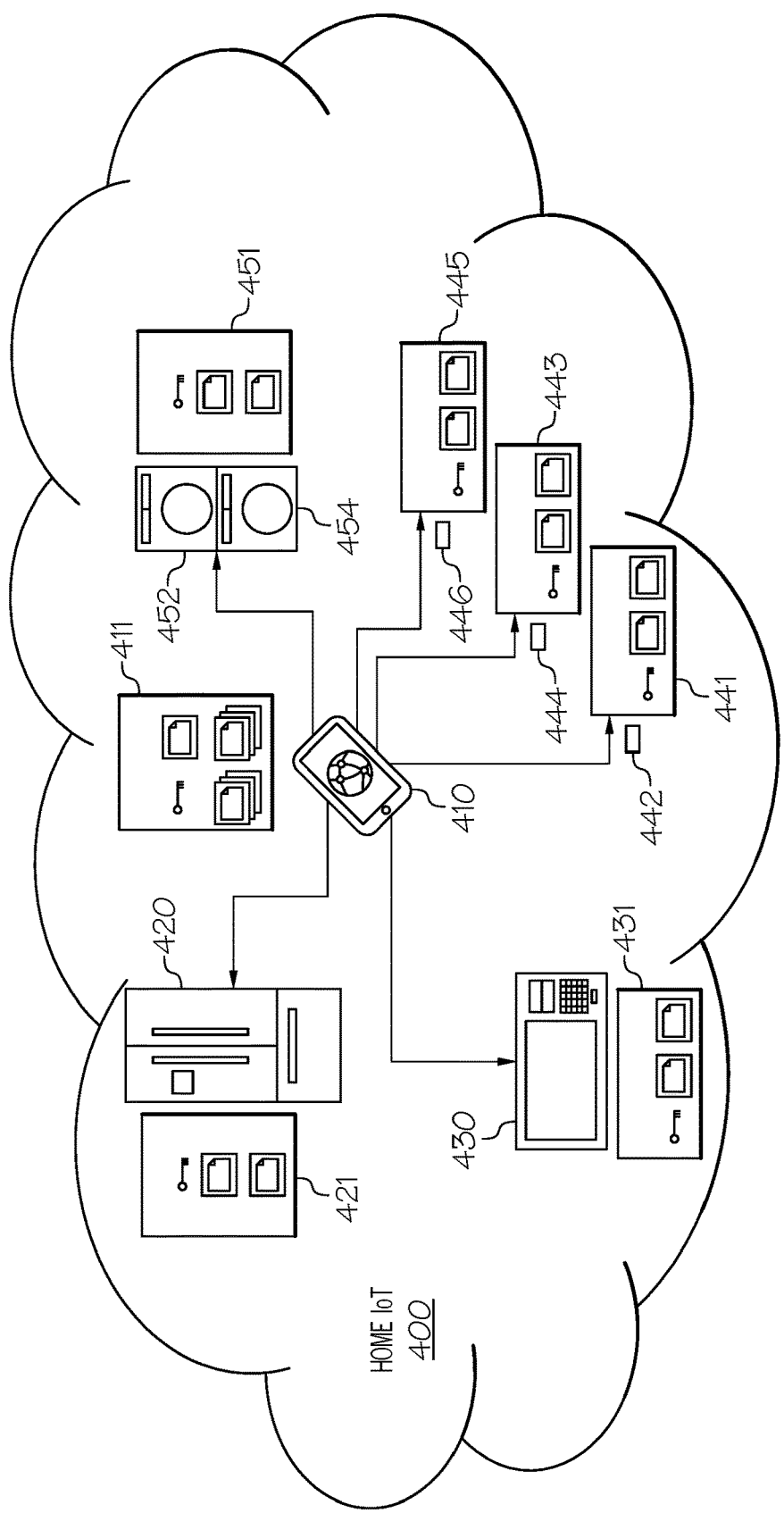
FIG. 4 illustrates a real-world implementation of a system for generating and storing short-term or one-time-use X.509 digital certificates in a home Internet-of-Things (IoT) environment in accordance with a non-limiting embodiment of the present disclosure.

With reference to FIG. 4, a real-world implementation of a system 400 for generating and storing short-term or one-time-use X.509 digital certificates in a home Internet of Things (IoT) environment is illustrated in accordance with a non-limiting embodiment of the present disclosure. The Internet of Things (IoT) is a network of objects (e.g., devices, buildings, etc.) that are equipped with network connectivity, sensors, or software so that the objects can communicate with one another. For example, a "smart home" may be equipped with many different sensors or devices that are connected to the Internet, for example in a wired or wireless capacity. System 400 may include a smartphone 410 or other device that is connected to one or more other devices in a home environment and can send and receive short-term or one-time-use digital certificates 411 with other devices in the home, for example microwave 430. Microwave 430 may have Internet connectivity and software that enables it to send and receive short-term or one-time-use digital certificates 431. System 400 may also include refrigerator 420 that has connectivity enabling it to send and receive short-term or one-time-use digital certificates 421. System 400 may also include one or more washing machines or dryers 452 or 454, respectively, that have connectivity and can send or receive short-term or one-time-use digital certificates 451. System 400 may also include one or more other devices or chips 442, 444, or 446 that are embedded into other portions of the home or building that can send and receive short-term or one-time-use digital certificates 441, 443, or 445, respectively.

Figure 5:
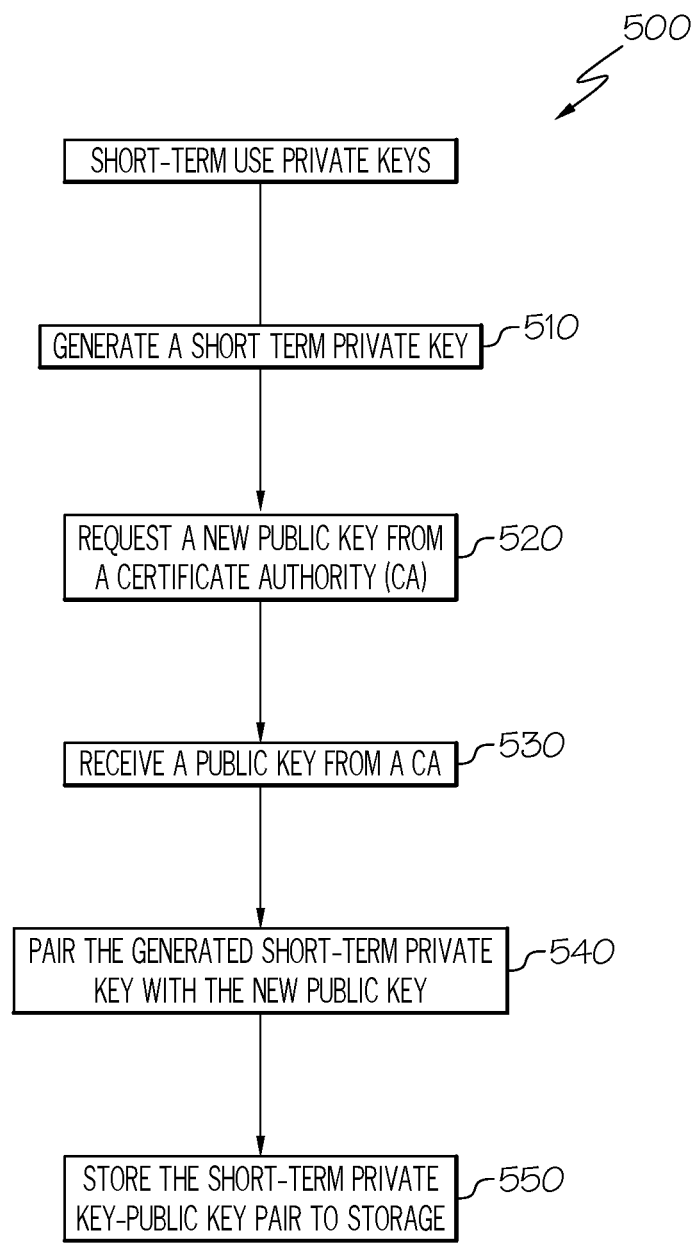
FIG. 5 illustrates a flow chart of a method for generating and storing short-term X.509 digital certificates in accordance with a non-limiting embodiment of the present disclosure.

With reference to FIG. 5, a flow chart of a method for generating and storing short-term X.509 digital certificates is illustrated in accordance with a non-limiting embodiment of the present disclosure. A method 500 for generating and using short-term private keys is described. The method comprises receiving a request from a certificate user (e.g., certificate user 42, certificate user 44, certificate user 46) to utilize a short-term private key-public key pair. The short-term public key-private key pair may include a short-term private key, which may expire after a period less than a year in length, and a public key. The short-term private key may be used for a period of time specified in the software or specified by a user. The expiration period may be specified by a user input, for example via a mouse or keyboard. The expiration period may also be specified via a configuration file. The expiration period may also be determined by an algorithm in the software. The short-term private key may be used for a set time (e.g., 1 day, 1 week, 1 year), or may be used for a set number of times before it expires and is disposed (e.g., 1 time, 5 times, 10 times). In an alternative embodiment, the short-term private key may be re-used an unlimited number of times until it expires. The public key may also be used for a set period of time or may be used for a set number of times before it expires and is disposed. At step 510, the method generates, using processor 13, a short-term private key. The method may also generate a public key using processor 13. The public key may correspond to the short-term private key. At step 520, the method may request a new public key or public key certificate from a Certificate Authority (CA). The request for the new public key certificate may include the generated public key and identifying information about the certificate requestor. The CA may verify the authenticity of the certificate requestor, for example if the certificate requestor signs the request for the public key certificate, the CA may verify that the signature is valid before issuing a public key certificate. The CA thus acts as a trusted third party to verify the identity of the certificate requestor. After verifying the signature of the certificate requestor, the CA may sign the public key certificate and return the public key certificate to the certificate requestor.

At step 530, the certificate requestor may receive a public key certificate from the CA. The public key certificate may be signed by the CA. At step 540, the method may pair the generated short-term private key with the signed public key certificate received from the CA. At step 550, the method may store the short-term private key-public key pair to storage. The method may also include using the short-term private key-public key pair. The short-term private key-public key pair can be used for any purpose, for example to secure data. Securing data may include authenticating an entity that intends to send or receive the data. Securing data may further include signing a document or encrypting data to be sent over network 30. The short-term private key-public key pair may be used for signing a document, a portion of a document, a transaction, or a portion of the transaction. For example, the method may include producing an extensible markup language (XML) document (a security assertion markup language (SAML) Assertion) which is sent as a part of a transaction from an Identity Provider to a Service Provider. This XML document may contain a signature that can sign either the entire document or only a portion of the document. As another example, the short-term private key-public key pair may be used to authenticate a certificate user. As yet another example, the short-term private key-public key pair may be used to encrypt data or information. After a single use of the short-term private key-public key pair, the method may include discarding the short-term private key-public key pair. The method may further include retrieving the short-term private key-public key pair that was previously stored to storage from said storage. The method may further include determining whether the short-term private key-public key pair is invalid. The short-term private key-public key pair may be invalid if either the short-term private key or the public key—or both—are invalid. Either the short-term private key or the public key may be invalid if one of the pair are expired, revoked, suspended, or otherwise inactive. For example, if the short-term private key has a set expiration period and that expiration period has passed, it may be expired and thus invalid. As another example, if the short-term private key is set to expire after one use, then after the key has been used once, it may be expired and thus invalid. As another example, if the public key corresponding to the short-term private key has expired or has been revoked (e.g., on a certificate revocation list (CRL) or has an invalid validity period as part of its certificate), then both the short-term private key and the public key may be invalid. The method thus may include determining whether the short-term private keypublic key pair has expired. The method may include receiving as input from a user a configuration specifying a length of an expiration period for the short-term private key. The method may include generating multiple short-term private key-public key pairs and storing multiple pairs to storage. The method may include a first short-term private key-public key pair and a second short-term private key-public key pair being stored to storage. The method may include any two short-term private key-public key pairs being independent from one another. For example, short-term private keys may be stored in high-security storage or low-security storage without tying the short-term private key to any other short-term private key. Rather, the short-term private keys may be entirely independent of one another.

Figure 6:
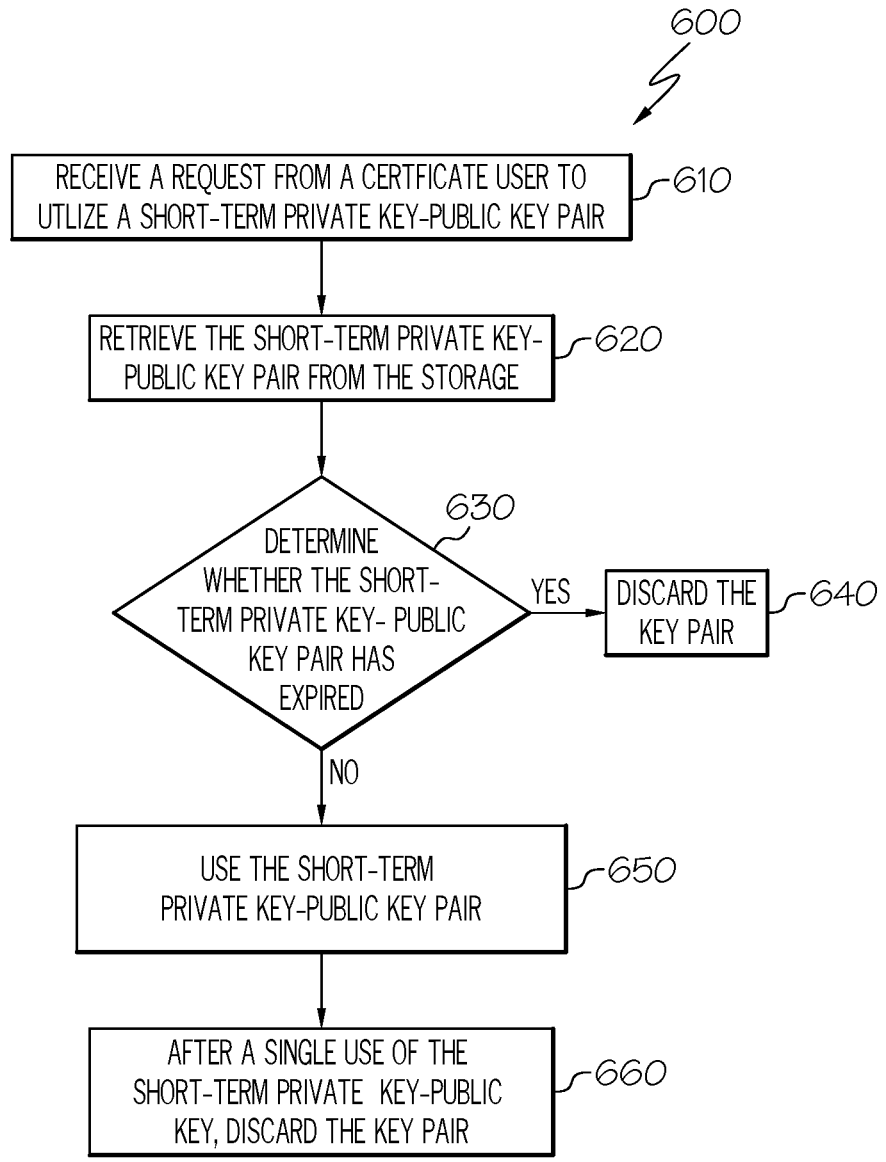
FIG. 6 illustrates a flow chart of a method for using short-term X.509 digital certificates in accordance with a non-limiting embodiment of the present disclosure.

With reference to FIG. 6, a flow chart of a method 600 for using short-term X.509 digital certificates is illustrated in accordance with a non-limiting embodiment of the present disclosure. At step 610, the method receives a request from a certificate user to utilize a short-term private key-public key pair. At step 620, the method retrieves the short-term private key-public key pair from the storage. At step 630, the method determines whether the short-term private key-public key pair has expired. If the short-term private key-public key pair has expired, then the method discards the short-term private key-public key pair at step 640. If the short-term private key-public key pair has not expired, then the method uses the short-term private key-public key pair at step 650. At step 660, after a single use of the short-term private key-public key, the method discards the short-term private key-public key pair. The method may discard the key pair immediately upon using the key pair or may wait. For example, the method may mark the key pair for deletion and wait for a future clean-up routine to discard the key pair.

Figure 7:
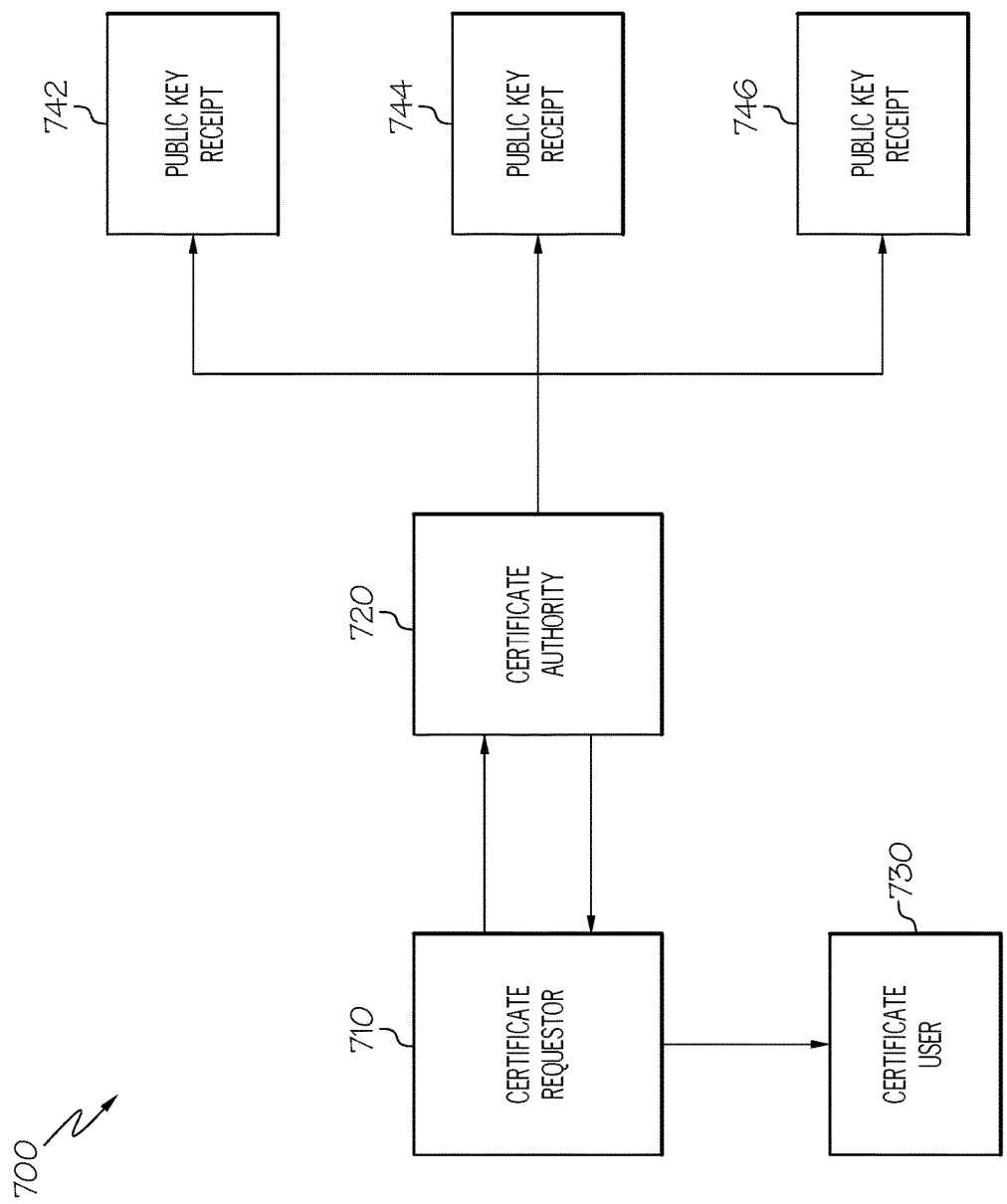
FIG. 7 illustrates a system for requesting and using short-term X.509 digital certificates in accordance with a non-limiting embodiment of the present disclosure.

With reference to FIG. 7, a system 700 for requesting and using short-term X.509 digital certificates is illustrated in accordance with a non-limiting embodiment of the present disclosure. System 700 may comprise certificate requestor 710, which may request a public key certificate from Certificate Authority (CA) 720. Certificate requestor 710 may receive from certificate user 730 a list of distribution addresses to whom the public key certificate should be sent. Certificate requestor 710 may send the list of distribution addresses to CA 720. CA 720 may generate a public key certificate and return that public key certificate to certificate user 730 through certificate requestor 710. CA 720 may also transmit the generated public key certificate to one or more addresses on the list of distribution addresses. For example, if public key recipients 742, 744, and 746 were each on the list of distribution addresses, CA 720 may transmit the generated public key certificate to public key recipients 742, 744, and 746.

Figure 8:
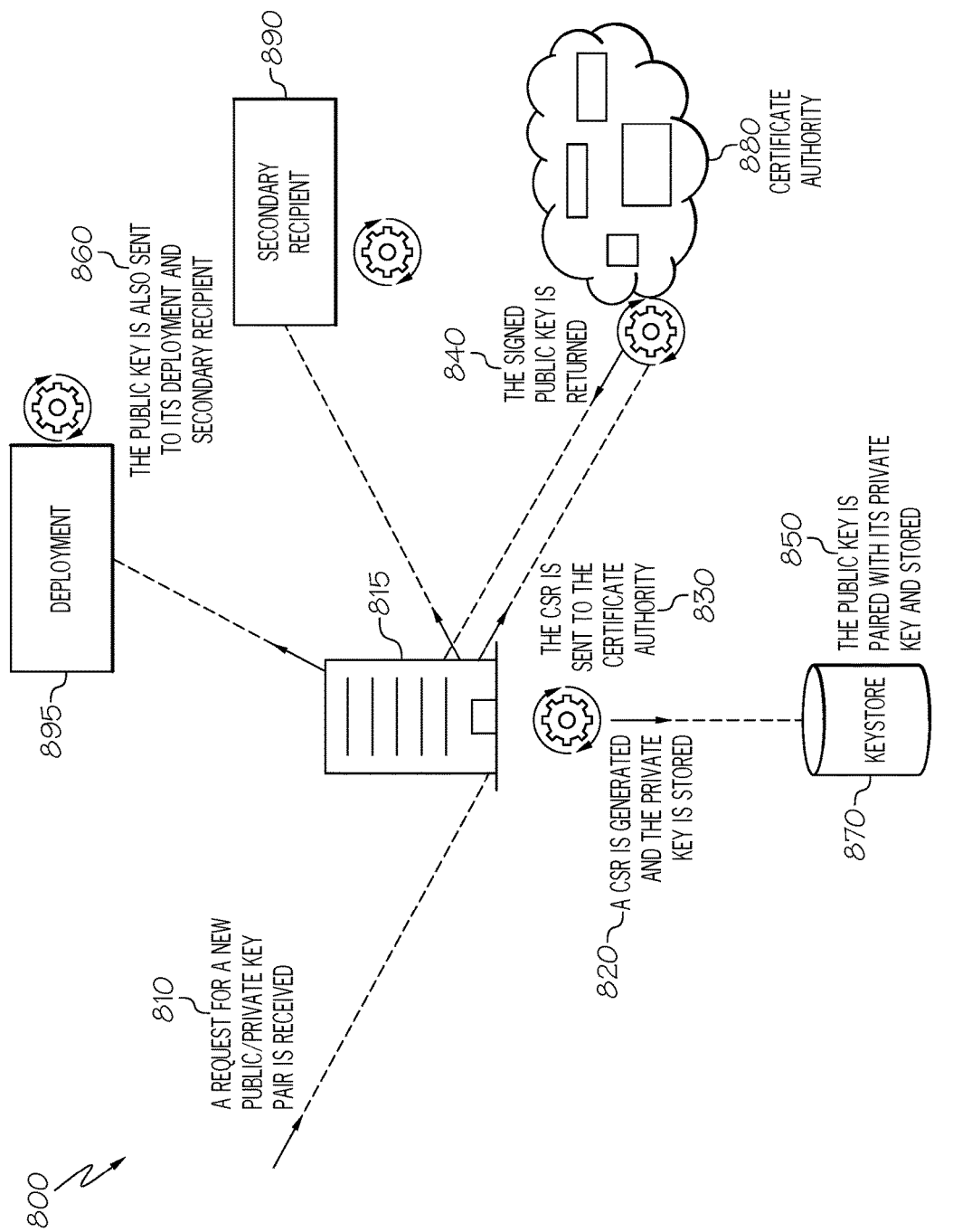
FIG. 8 illustrates a system and a method for requesting and using short-term X.509 digital certificates in accordance with a non-limiting embodiment of the present disclosure.

With reference to FIG. 8, a system 800 and a method for requesting and using short-term X.509 digital certificates is illustrated in accordance with a non-limiting embodiment of the present disclosure. At step 810, a request for a new short-term private key-public key pair is received by a certificate requestor 815. At step 820, a certificate signing request (CSR) is generated using processor 13, along with a new short-term private key and public key. The short-term private key is temporarily stored unpaired in keystore 870. At step 830, the CSR is sent to the Certificate Authority (CA) 880. CA 880 verifies the identity of certificate requestor 815, generates a public key certificate, and signs the public key certificate. At step 840, the signed public key certificate is returned from CA 880 to certificate requestor 815. Certificate requestor pairs the signed public key certificate with its corresponding private key at step 850 and stores the resulting key pair in keystore 870. Either CA 880 or certificate requestor may transmit the signed public key certificate to a certificate user for deployment at step 860 and also to secondary recipient 890. The certificate user uses the signed public key certificate in its deployment environment 895.

Figure 9:
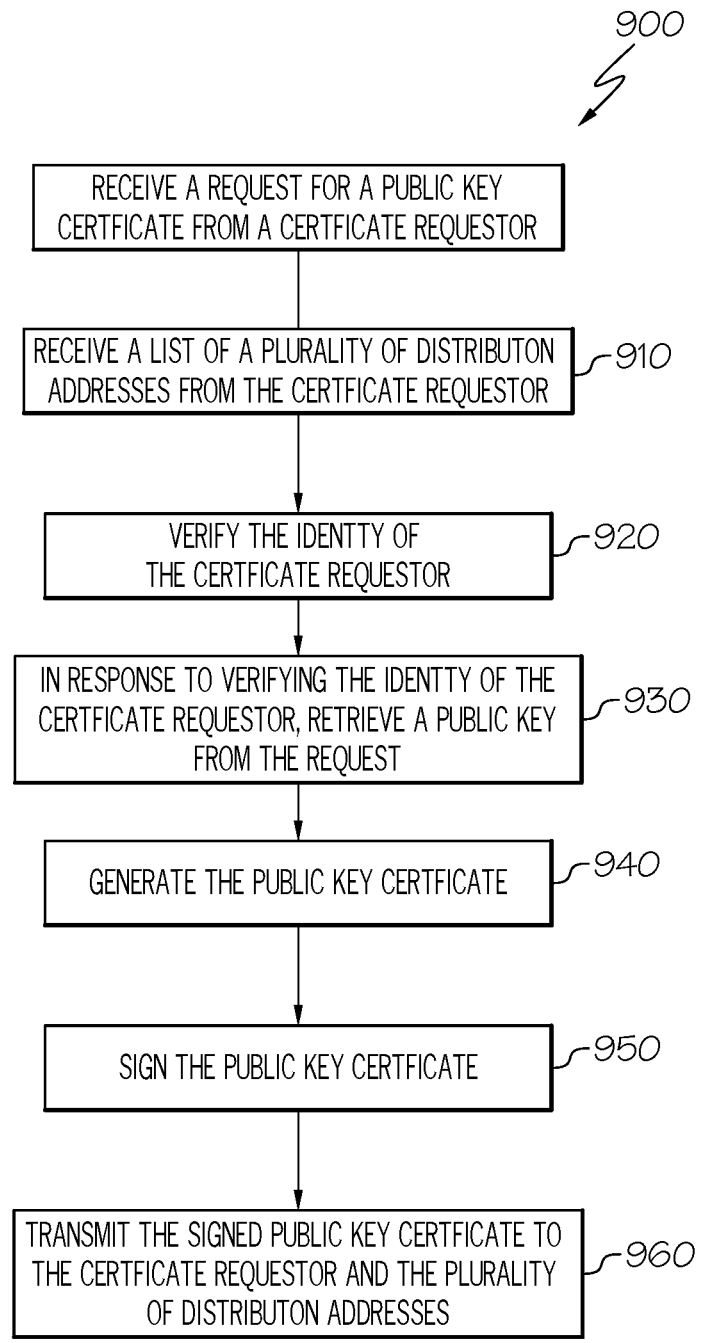
FIG. 9 illustrates a flow chart of a method for synchronized X.509 digital certificate deployment in accordance with a non-limiting embodiment of the present disclosure.

With reference to FIG. 9, a flow chart of a method 900 for synchronized X.509 digital certificate deployment is illustrated in accordance with a non-limiting embodiment of the present disclosure. Method 900 may be performed at a Certificate Authority (CA) or by another entity. Method 900 may include receiving a request for a public key certificate from a certificate requestor. At step 910, method 900 may include receiving a list of a plurality of distribution addresses from a certificate requestor. Each distribution address may belong to a third party (i.e., a party other than the certificate requestor). The list of distribution addresses may include one or multiple distribution addresses. The list of distribution addresses may be received from a certificate user via a configuration file or via a user input such as a keyboard or mouse. The list of distribution addresses may also be generated by the certificate requestor. At step 920, method 900 may include verifying an identity of the certificate requestor. In response to verifying the identity of the certificate requestor, at step 930 method 900 may retrieve a public key from the request. At step 940, method 900 may generate the public key certificate. The public key certificate may include the public key retrieved from the request. At step 950, method 900 may sign the public key certificate. All of these steps (e.g., steps 930, 940, and 950) may be performed in response to verifying the identity of the certificate requestor or independently. At step 960, method 900 may transmit the signed public key certificate to both the certificate requestor and the plurality of distribution addresses. Accordingly, method 900 may distribute the signed public key certificate to each of the addresses on the original list. The CA may transmit the signed public key certificate to both the original certificate requestor and to the plurality of distribution addresses contemporaneously.

The request for the public key certificate may be signed by the certificate requestor, and the CA may verify the authenticity of the certificate requestor's signature in order to verify the identity of the certificate requestor. Method 900 may further include receiving a request for a second public key certificate from a second certificate requestor. The request for the second public key certificate may include a public key for the second certificate requestor. Method 900 may further include receiving the public key for the second certificate requestor from the request for the second public key certificate. Method 900 may further include receiving a second list of a plurality of distribution addresses from the second certificate requestor. Method 900 may also include retrieving the public key for the second certificate requestor from the request for the second public key certificate. Method 900 may further include determining whether the public key for the second public key certificate is invalid, and in response to determining that the public key for the second certificate requestor is invalid, discarding the public key for the second certificate requestor without generating a second public key certificate. A public key may be considered invalid if it has expired, been revoked (e.g., on a certificate revocation list (CRL)), has been suspended, or has otherwise become inactive. Determining whether the public key for the second certificate requestor is invalid may include determining whether the key has expired or has been revoked. If the public key is not invalid (i.e., if the public key is active), then method 900 may not discard the public key and may instead return a signed public key certificate with the public key inside. Method 900 may further include receiving a request for a second public key certificate from a second certificate requestor. The request for the second public key certificate may include a public key for the second certificate requestor. Method 900 may further include receiving a second list of a plurality of distribution addresses from the second certificate requestor. Method 900 may include attempting to verify the identity of the second certificate requestor. In response to being unable to verify the identity of the second certificate requestor, method 900 may include discarding the public key of the second certificate requestor without generating the second public key certificate. In response to being able to verify the identity of the second certificate requestor, method 900 may include generating and transmitting a second public key certificate to the second certificate requestor.

Figure 10:
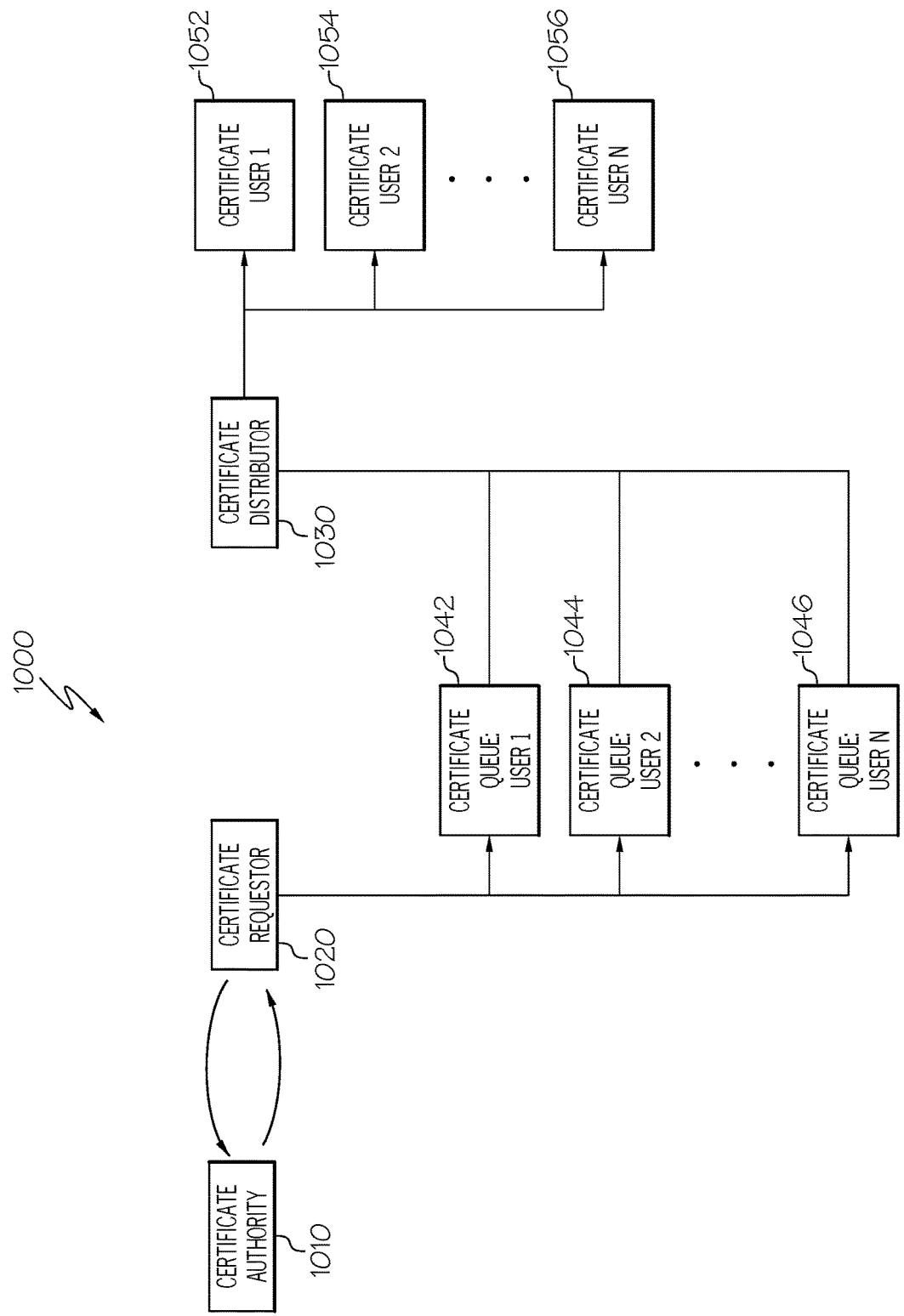
FIG. 10 illustrates a system for storing X.509 digital certificates in a queueing environment in accordance with a non-limiting embodiment of the present disclosure.

With reference to FIG. 10, a system 1000 for storing X.509 digital certificates in a queueing environment is illustrated in accordance with a non-limiting embodiment of the present disclosure. System 1000 may include certificate requestor 1020 that requests a public key certificate from Certificate Authority (CA) 1010. CA 1010 may return a public key certificate to certificate requestor 1020. Certificate requestor 1020 may pair the public key certificate with a private key. The private key may be a traditional private key (which may not expire for 1 to 5 years) or a short-term private key (which expires, for example, less than a year after being created or may be discarded after, for example, a singular use). Certificate requestor may store the private key-public key pairs in one or more certificate queues 1042, 1044, and 1046. One or more certificate users 1 through N, or for example certificate users 1052, 1054, and 1056 may have a corresponding queue in system 1000. Accordingly, all of the certificates stored for example in certificate queue 1042 may be allocated for certificate user 1052. There may be one or more certificate queues, depicted in FIG. 10 as certificate queues for users 1 through N. In another embodiment, certificate queues may not be tied to certificate users and may be used in accordance with another algorithm. For example certificate queues may be created dynamically and distributed according to efficiency or storage requirements of a system. System 1000 may further include certificate distributor 1030, which may distribute one or more private key-public key pairs stored in one of certificate queues 1042, 1044, or 1046 to certificate users 1052, 1054, or 1056. For example, if certificate user 1 1052 requests a private key-public key pair, certificate distributor 1030 may retrieve the private key-public key pair at the front of certificate queue 1042 and distribute that pair to certificate user 1.

Figure 11:
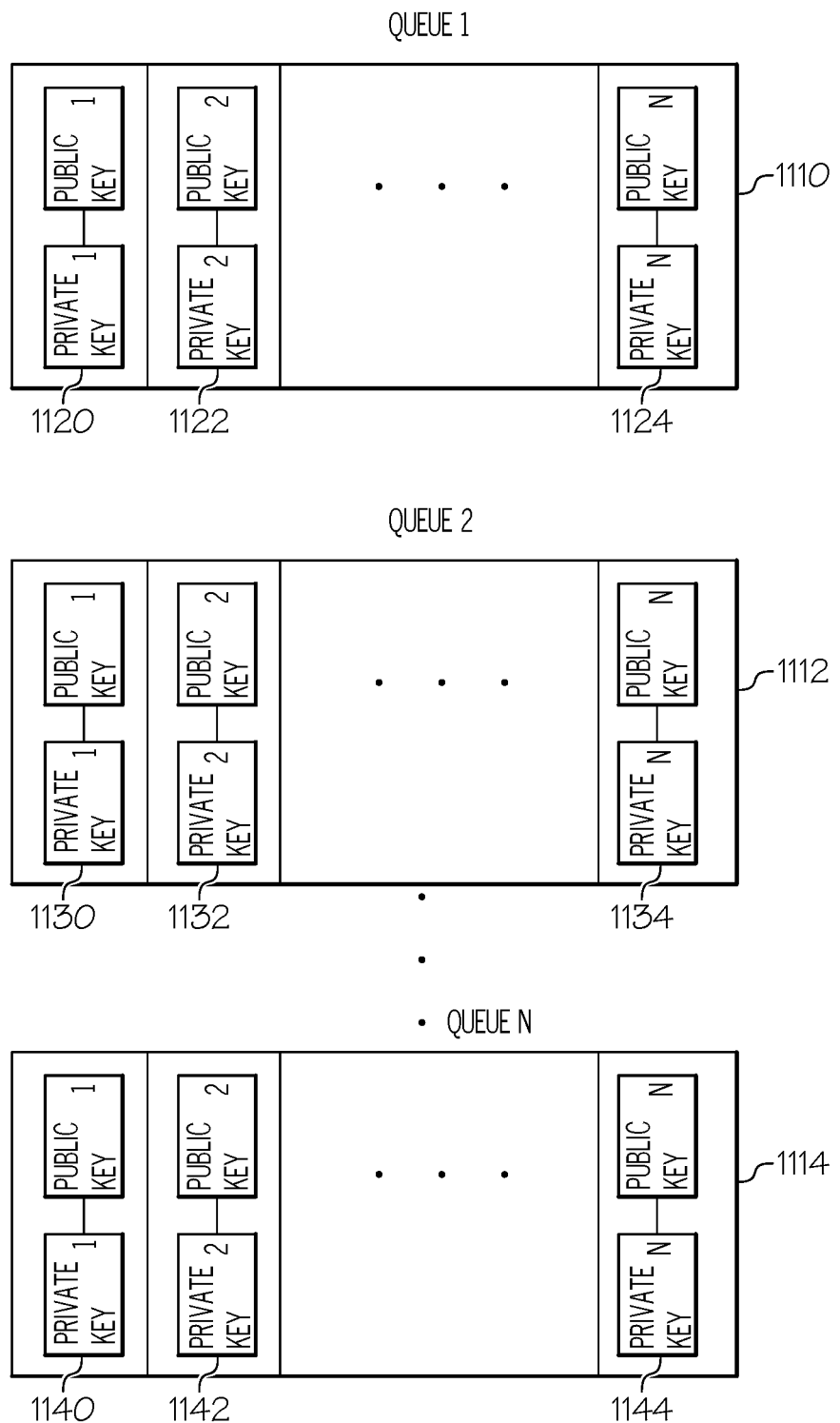
FIG. 11 illustrates a real-world implementation of the queueing environment for storing X.509 digital certificates in accordance with a non-limiting embodiment of the present disclosure.

With reference to FIG. 11, a real-world implementation of the queueing environment for storing X.509 digital certificates is illustrated in accordance with a non-limiting embodiment of the present disclosure. The queueing environment may contain any number of queues, for example queues 1 through N. The queues may be implemented in any programming language and in any type of storage. In each queue, for example queue 1110, a series of private key-public key pairs, for example pair 1120, pair 112, and pair 1124, may be stored. Similarly, key pair 1130, 1132, and 1134 may be stored in queue 1112, and pairs 1140, 1142, and 1144 may be stored in queue 1114. When a pair is requested, the method may retrieve a front key pair in a queue, for example private key-public key pair 1120 in queue 1110. The front key pair may have been the oldest key pair stored in the queue. According, the queues may embody a First In, First Out (FIFO) structure. When a new key pair is stored to the queue, the key pair will be stored in the back of the queue, for example as key pair 1124 in queue 1110.

Figure 12:
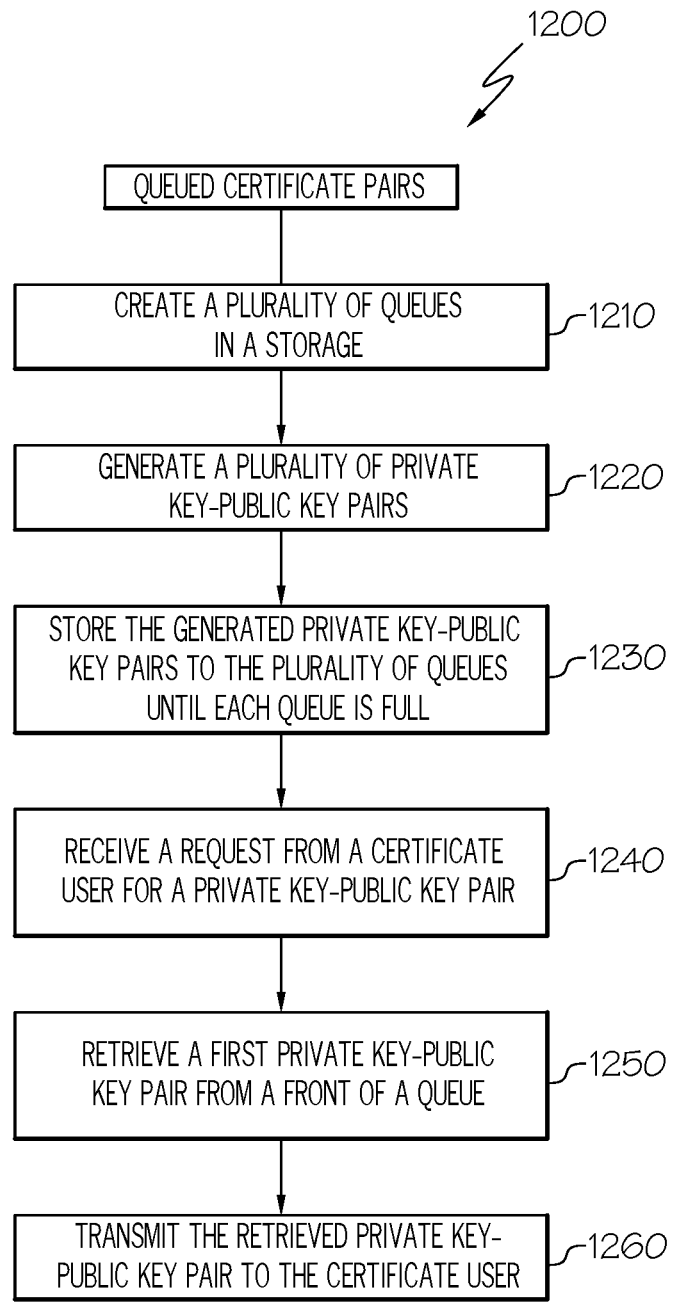
FIG. 12 illustrates a flow chart of a method for storing X.509 digital certificates in a queueing environment in accordance with a non-limiting embodiment of the present disclosure.

With reference to FIG. 12, a flow chart of a method 1200 for storing X.509 digital certificates in a queueing environment is illustrated in accordance with a non-limiting embodiment of the present disclosure. At step 1210, method 1200 may create a plurality of queues in a storage. For respective queues of a plurality of queues stored in a storage, at step 1220, method 1200 may generate, using processor 13, a private key-public key pair. In other words, at step 1120, method 1200 may generate a plurality of private key-public key pairs. The private key-public key pairs may include private keys and public keys. The private keys included in the private key-public key pairs may be traditional public keys that do not expire for 1 to 5 years or a short-term private keys that may expire, for example, before a year or may be discarded, for example, after a singular use. To generate a private key-public key pair, method 1200 may generate, using processor 13, a private key and a public key. Method 1200 may request a public key certificate from a Certificate Authority (CA). The request for the public key certificate may include the public key. Method 1200 may further include receiving the public key certificate from the CA and pairing the previously-generated private key with the public key certificate received from the CA. Each private key-public key pair may be contained within a digital certificate, for example a X.509 digital certificate. The plurality of queues thus may hold a plurality of digital certificates that contain the key pairs.

At step 1230, method 1200 may store the generated private key-public key pairs to the plurality of queues. This step may occur for each queue until that queue is full, then move on to the next queue. This step may also occur for any number or configuration of queues. The queues may be filled in any order. At step 1240, method 1200 receives a request from a certificate user to utilize a private key-public key pair. The certificate user may use the private key-public key pair for any purpose, including to secure data. Securing data may include, for example, encrypting data or information, signing a document or portion of document, signing a transaction or a portion of a transaction, or authenticating data, for example by authenticating the identity of a user. At step 1250, method 1200 retrieves a first private key-public key pair from a front of a queue. Method 1200 may further include using the first private key-public key pair, for example in the manner described above. At step 1260, method 1200 may include transmitting the retrieved private key-public key pair to a certificate user and/or using the first private key-public key pair, for example in the manner described above. Method 1200 may further include generating a new private key-public key pair to replace the first private key-public key pair. Method 1200 may further include storing the new private key-public key pair to a back of a first queue. For example, if certificate user 1 used the front key pair from queue 1, method 1200 may generate a new key pair and place it on the back of queue 1. In this manner, method 1200 keeps the queues in a full or near-full state so that key pair retrieval is fast and efficient.

Method 1200 may further include retrieving a second private key-public key pair from a front of a second queue of the plurality of queues and determining whether a private key of the second private key-public key pair is invalid (e.g., expired). Whether a key pair is considered invalid is described in detail above. Method 1200 may further include, in response to determining that the private key of the second private key-public key pair is invalid, discarding the second private key-public key pair and retrieving subsequent private key-public key pairs from the second queue until a private key-public key pair that is not invalid is retrieved. Method 1200 may further include retrieving subsequent private key-public key pairs from one or more queues of the plurality of queues if a valid key pair is not found on one queue. Method 1200 may further include, in response to retrieving the private key-public key pair with the valid private key, using the private key-public key pair with the valid private key. If no key pair with a valid private key is found, method 1200 may return an error and/or wait for a private key-public key pair that is valid to be created. Method 1200 thus may further include generating a private key-public key pair that is valid and using that valid key. Method 1200 may also perform the actions stated above in determining whether a private key-public key pair with a valid public key (rather than private key) exists.

Method 1200 may further include discarding the private key-public key pair after a single use of the first private key-public key pair. Method 1200 may further include a cleanup mechanism to discover and discard expired or otherwise invalid private key-public key pairs stored in the plurality of queues. For example, method 1200 may include, at configured intervals, iterating through each private key-public key pair of the plurality of private key-public key pairs stored in the plurality of queues, determining whether each private key-public key pair is invalid, for discarding each private key-public key pair that is invalid. For each invalid private key-public key pair, method 1200 may include generating a new private key-public key pair and storing the new private key-public key pair to the queue from which the invalid private key-public key pair was discarded. In other words, method 1200 may refill the queues with new, valid key pairs.

Figure 13:
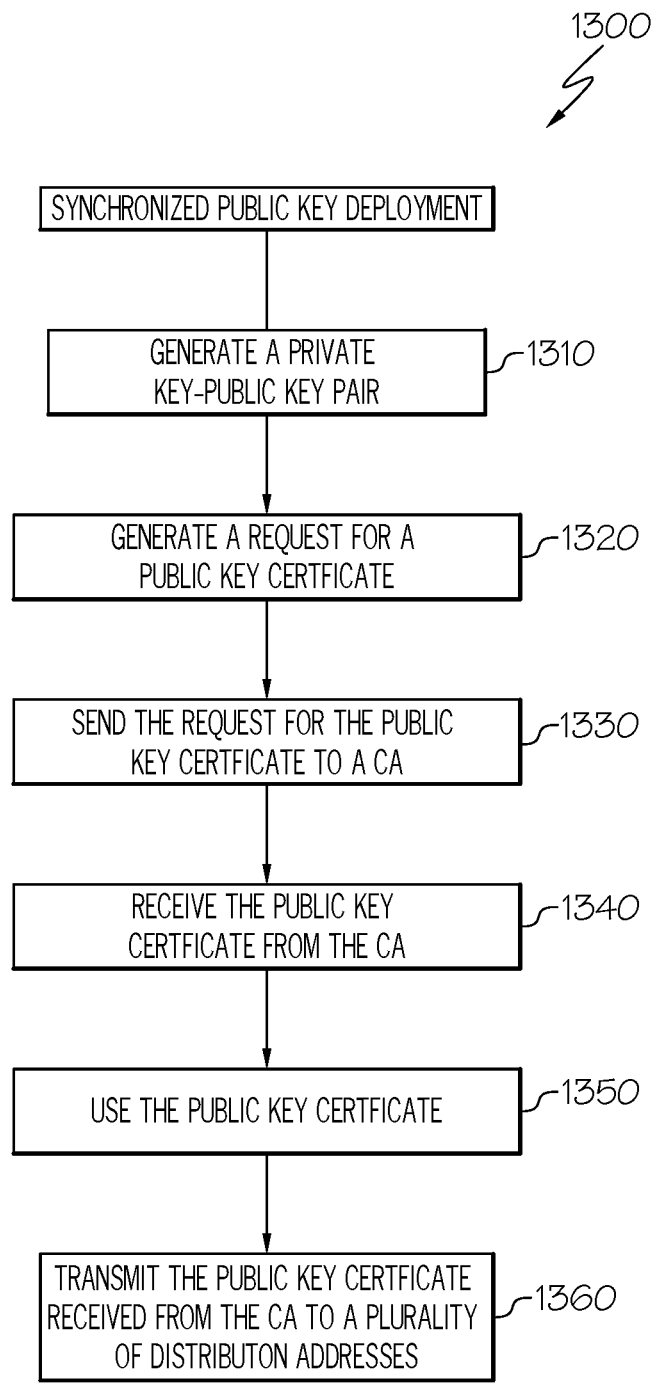
FIG. 13 illustrates a flow chart of a method for synchronized X.509 digital certificate deployment in accordance with a non-limiting embodiment of the present disclosure.

With reference to FIG. 13, a flow chart of a method 1300 for synchronized X.509 digital certificate deployment is illustrated in accordance with a non-limiting embodiment of the present disclosure. Synchronized X.509 digital certificate deployment may be implemented at certificate requestor in addition to at the Certificate Authority, as described above. Method 1300 thus may take place at the certificate requestor. At step 1310, method 1300 may generate, using processor 13, a private key-public key pair. The private key-public key may include a private key and a public key. The private key may be of the traditional type described above or of the short-term type also described above. At step 1320, method 1300 may generate a request for a public key certificate. The request for the public key certificate may include the public key generated above. At step 1330, method 1300 may send the request for the public key certificate to the Certificate Authority (CA). At step 1340, method 1300 may receive the public key certificate from the CA. The public key certificate may be signed by the CA. At step 1350, method 1300 may use the public key certificate received from the CA, for example for the uses described above (e.g., securing data, encrypting data, signing documents, portions of documents, or transactions, or authenticating entities). At step 1360, method 1300 may transmit the public key certificate received from the CA to a plurality of distribution addresses. Each of the distribution addresses may belong to a third party. A list of distribution addresses may be provided to the certificate requestor by a certificate user, for example via a configuration file or via user input such as a keyboard or a mouse. In an alternate embodiment, the list of distribution addresses may be generated by the certificate requestor. The public key certificate may be transmitted to the plurality of distribution addresses contemporaneously with receiving the public key certificate from the CA.

Method 1300 may further include signing the request for the public key certificate before the request is sent to the CA. The CA may verify the signature of the request before it issues or signs the public key certificate. The method may further include generating, using processor 13, a second private key-public key pair. The second private key-public key pair may include a second public key and a second private key. Method 1300 may further include generating a request for a second public key certificate. The request may include the second public key. Method 1300 may include sending the request for the public key certificate to the CA, and receiving an indication from the CA that the CA will not send the public key certificate. For example, the indication may indicate that the CA will not send the public key certificate because one of the private key or the public key were invalid (e.g., expired), or because the CA could not verify a signature of the certificate requestor, among other reasons. Method 1300 may further include discarding the private key-public key pair after receiving the indication that the CA will not send the public key certificate.

The flowchart and block diagrams in the figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

What is claimed is:

1. A method, comprising:
   receiving, from a certificate requestor:
      a request for a public key certificate, the request comprising a public key for the certificate requestor; and
      a list of a plurality of distribution addresses, wherein the plurality of distribution addresses belong to a plurality of third parties;
   verifying an identity of the certificate requestor;
   in response to verifying the identity of the certificate requestor:
      retrieving a public key from the request for the public key certificate;
      generating the public key certificate, the public key certificate comprising the public key; and
      signing the public key certificate; and
   transmitting the signed public key certificate contemporaneously to both the certificate requestor and the plurality of distribution addresses.

2. The method of claim 1, wherein the request for the public key certificate is signed by the certificate requestor, and
   wherein verifying the identity of the certificate requestor comprises verifying an authenticity of a signature of the certificate requestor.

3. The method of claim 1, further comprising:
   receiving, from a second certificate requestor:
      a request for a second public key certificate, the request for the second public key certificate comprising a public key for the second certificate requestor; and
      a second list of a plurality of distribution addresses;
   retrieving the public key for the second certificate requestor from the request for the second public key certificate;
   determining whether the public key for the second certificate requestor is invalid; and
   in response to determining that the public key for the second certificate requestor is invalid, discarding the public key for the second certificate requestor without generating the second public key certificate.

4. The method of claim 3, wherein determining whether the public key for the second certificate requestor is invalid comprises determining whether the public key for the second certificate requestor has expired.

5. The method of claim 3, wherein determining whether the public key for the second certificate requestor is invalid comprises determining whether the public key for the second certificate requestor has been revoked.

6. The method of claim 1, wherein the list of the plurality of distribution addresses is received from the certificate requestor via a configuration file.

7. The method of claim 1, further comprising:
receiving, from a second certificate requestor:
a request for a second public key certificate, the request for the second public key certificate comprising a public key for the second certificate requestor; and
a second list of a plurality of distribution addresses;
attempting to verify the identity of the second certificate requestor; and
in response to being unable to verify the identity of the second certificate requestor, discarding the public key for the second certificate requestor without generating the second public key certificate.

8. A computer configured to access a storage device, the computer comprising:
a processor; and
a non-transitory, computer-readable storage medium storing computer-readable instructions that when executed by the processor cause the computer to perform:
in response to receiving information from a certificate requestor, verifying an identity of the certificate requestor, wherein the information comprises:
a request for a public key certificate, the request comprising a public key for the certificate requestor; and
a list of a plurality of distribution addresses, wherein the plurality of distribution addresses belong to a plurality of third parties;
in response to verifying the identity of the certificate requestor:
retrieving a public key from the request for the public key certificate;
generating the public key certificate, the public key certificate comprising the public key; and
signing the public key certificate; and
transmitting the signed public key certificate contemporaneously to both the certificate requestor and the plurality of distribution addresses.

9. The computer of claim 8, wherein the request for the public key certificate is signed by the certificate requestor, and
wherein the computer-readable instructions that cause the computer to perform verifying the identity of the certificate requestor further cause the computer to perform verifying an authenticity of a signature of the certificate requestor.

10. The computer of claim 8, wherein the computer-readable instructions further cause the computer to perform:
in response to receiving from a second certificate requestor:
a request for a second public key certificate, the request for the second public key certificate comprising a public key for the second certificate requestor, and
a second list of a plurality of distribution addresses, wherein the plurality of distribution addresses belong to a plurality of third parties,
retrieving the public key for the second certificate requestor from the request for the second public key certificate;
determining whether the public key for the second certificate requestor is invalid; and
in response to determining that the public key for the second certificate requestor is invalid, discarding the public key for the second certificate requestor without generating the second public key certificate.

11. The computer of claim 10, wherein the computer-readable instructions that cause the computer to perform determining whether the second retrieved unsigned public key is invalid further cause the computer to perform determining whether the second retrieved unsigned public key has expired.

12. The computer of claim 10, wherein the computer-readable instructions that cause the computer to perform determining whether the second retrieved unsigned public key is invalid further cause the computer to perform determining whether the second retrieved unsigned public key has been revoked.

13. The computer of claim 8, wherein the list of the plurality of distribution addresses is received from the certificate requestor via a configuration file.

14. The computer of claim 8, wherein the computer-readable instructions further cause the computer to perform:
in response to receiving information from a second certificate requestor, attempting to verify the identity of the second certificate requestor, wherein the information comprises:
a request for a second public key certificate, the request for the second public key certificate comprising a public key for the second certificate requestor; and
a second list of a plurality of distribution addresses; and
in response to being unable to verify the identity of the second certificate requestor, discarding the public key for the second certificate requestor without generating the second public key certificate.

15. A non-transitory computer-readable storage medium storing instructions that are executable to cause a system to perform operations comprising:
in response to receiving information from a certificate requestor, verifying an identity of the certificate requestor, wherein the information comprises:
a request for a public key certificate, the request comprising a public key for the certificate requestor; and
a list of a plurality of distribution addresses, wherein the plurality of distribution addresses belong to a plurality of third parties;
in response to verifying the identity of the certificate requestor:
retrieving a public key from the request for the public key certificate;
generating the public key certificate, the public key certificate comprising the public key; and
signing the public key certificate; and
transmitting the signed public key certificate contemporaneously to both the certificate requestor and the plurality of distribution addresses.

16. The non-transitory computer readable storage medium of claim 15, wherein the instructions are executable to cause the system to further perform operations comprising:
in response to receiving from a second certificate requestor:
a request for a second public key certificate, the request for the second public key certificate comprising a public key for the second certificate requestor, and
a second list of a plurality of distribution addresses, wherein the plurality of distribution addresses belong to a plurality of third parties, retrieving the public key for the second certificate requestor from the request for the second public key certificate;

determining whether the public key for the second certificate requestor is invalid; and in response to determining that the public key for the second certificate requestor is invalid, discarding the public key for the second certificate requestor without generating the second public key certificate.

17. The non-transitory computer readable storage medium of claim 16, wherein the instructions that are executable to cause the system to perform operations comprising determining whether the second retrieved unsigned public key is invalid further cause the system to perform operations comprising determining whether the second retrieved unsigned public key has expired.

18. The non-transitory computer readable storage medium of claim 15, wherein the list of the plurality of distribution addresses is received from the certificate requestor via a configuration file.

19. The non-transitory computer readable storage medium of claim 15, wherein the instructions are executable to cause the system to further perform operations comprising:

in response to receiving information from a second certificate requestor, attempting to verify the identity of the second certificate requestor, wherein the information comprises:

a request for a second public key certificate, the request for the second public key certificate comprising a public key for the second certificate requestor; and a second list of a plurality of distribution addresses; and in response to being unable to verify the identity of the second certificate requestor, discarding the public key for the second certificate requestor without generating the second public key certificate.

* * * * *